United States Patent
Kuwahara

(10) Patent No.: US 7,752,571 B2
(45) Date of Patent: Jul. 6, 2010

(54) PROGRAM RECORDING MEDIUM RECORDED WITH FACSIMILE DRIVER PROGRAM

(75) Inventor: Tetsuya Kuwahara, Kyoto (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 1070 days.

(21) Appl. No.: 11/445,983

(22) Filed: Jun. 1, 2006

(65) Prior Publication Data

US 2006/0279795 A1 Dec. 14, 2006

(30) Foreign Application Priority Data

Jun. 8, 2005 (JP) .............................. 2005-168310

(51) Int. Cl.
*G06F 3/048* (2006.01)

(52) U.S. Cl. .................. 715/810; 715/808; 715/709; 399/79

(58) Field of Classification Search ................ 358/1.15; 715/810, 808, 709; 399/79
See application file for complete search history.

(56) References Cited

U.S. PATENT DOCUMENTS

| | | | | | |
|---|---|---|---|---|---|
| 5,668,640 | A | * | 9/1997 | Nozawa et al. | 358/434 |
| 5,668,931 | A | * | 9/1997 | Dermer | 358/1.4 |
| 6,208,426 | B1 | * | 3/2001 | Saito et al. | 358/1.15 |
| 6,269,395 | B1 | * | 7/2001 | Blatherwick et al. | 709/219 |
| 6,618,566 | B2 | * | 9/2003 | Kujirai et al. | 399/79 |
| 2003/0095289 | A1 | * | 5/2003 | Mitani | 358/402 |
| 2004/0046972 | A1 | * | 3/2004 | Shibao | 358/1.1 |
| 2005/0175215 | A1 | * | 8/2005 | Machida | 382/100 |

FOREIGN PATENT DOCUMENTS

| | | |
|---|---|---|
| JP | 06-216933 | 8/1994 |
| JP | 2001-282484 | 10/2001 |
| JP | 2002-236577 | 8/2002 |
| JP | 2002247315 A | 8/2002 |
| JP | 2003-333250 | 11/2003 |
| JP | 2004147294 A | 5/2004 |
| JP | 2004171327 A | 6/2004 |
| JP | 2005-031921 | 2/2005 |
| JP | 2005134982 A | 5/2005 |

OTHER PUBLICATIONS

Japanese language office action and its English language translation for corresponding Japanese application No. 2005168310 lists the references above.

* cited by examiner

*Primary Examiner*—Benny Q Tieu
*Assistant Examiner*—Quyen Ngo
(74) *Attorney, Agent, or Firm*—Hogan Lovells US LLP

(57) ABSTRACT

A facsimile driver program recorded in a program recording medium is installed in a client device for a user to enter the type of process requested of a multifunction device. A first transmission unit transmits a command to the multifunction device asking for a screen corresponding to the entered type of process. Using the facsimile driver program, a user can make appropriate selections so that, even when the multifunction device has a plurality of server functions, the user is not required to go through needless operations.

12 Claims, 8 Drawing Sheets

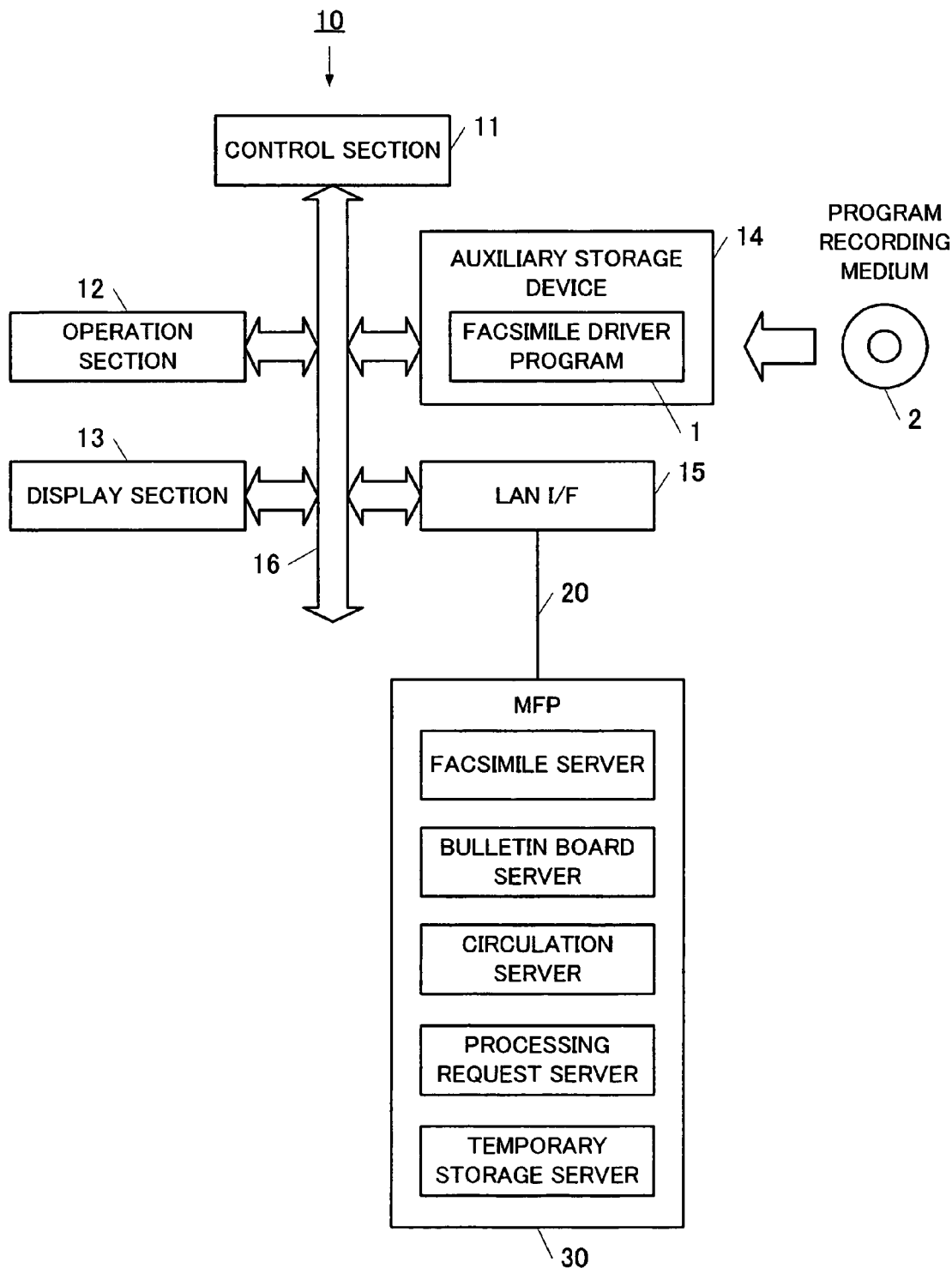

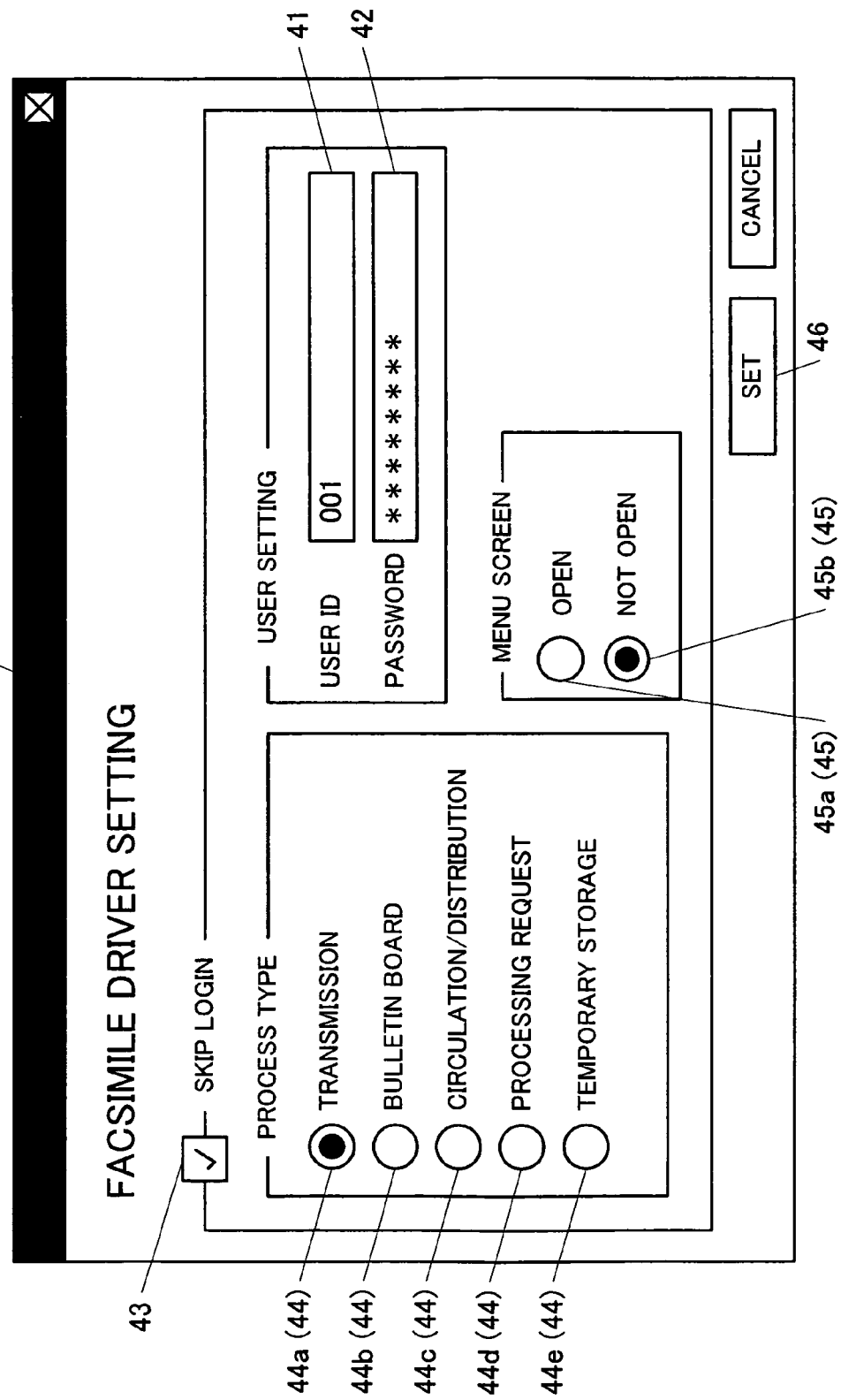

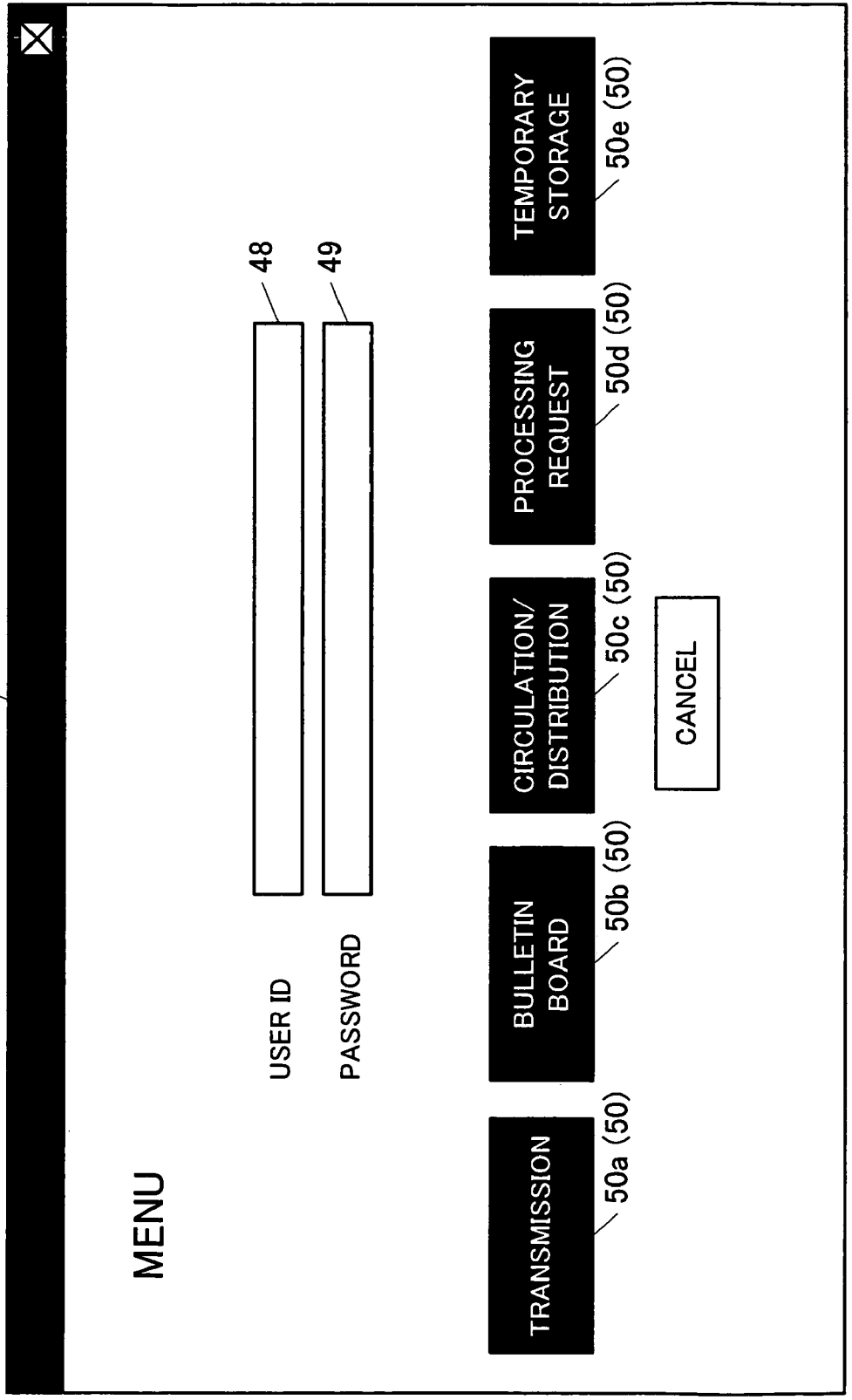

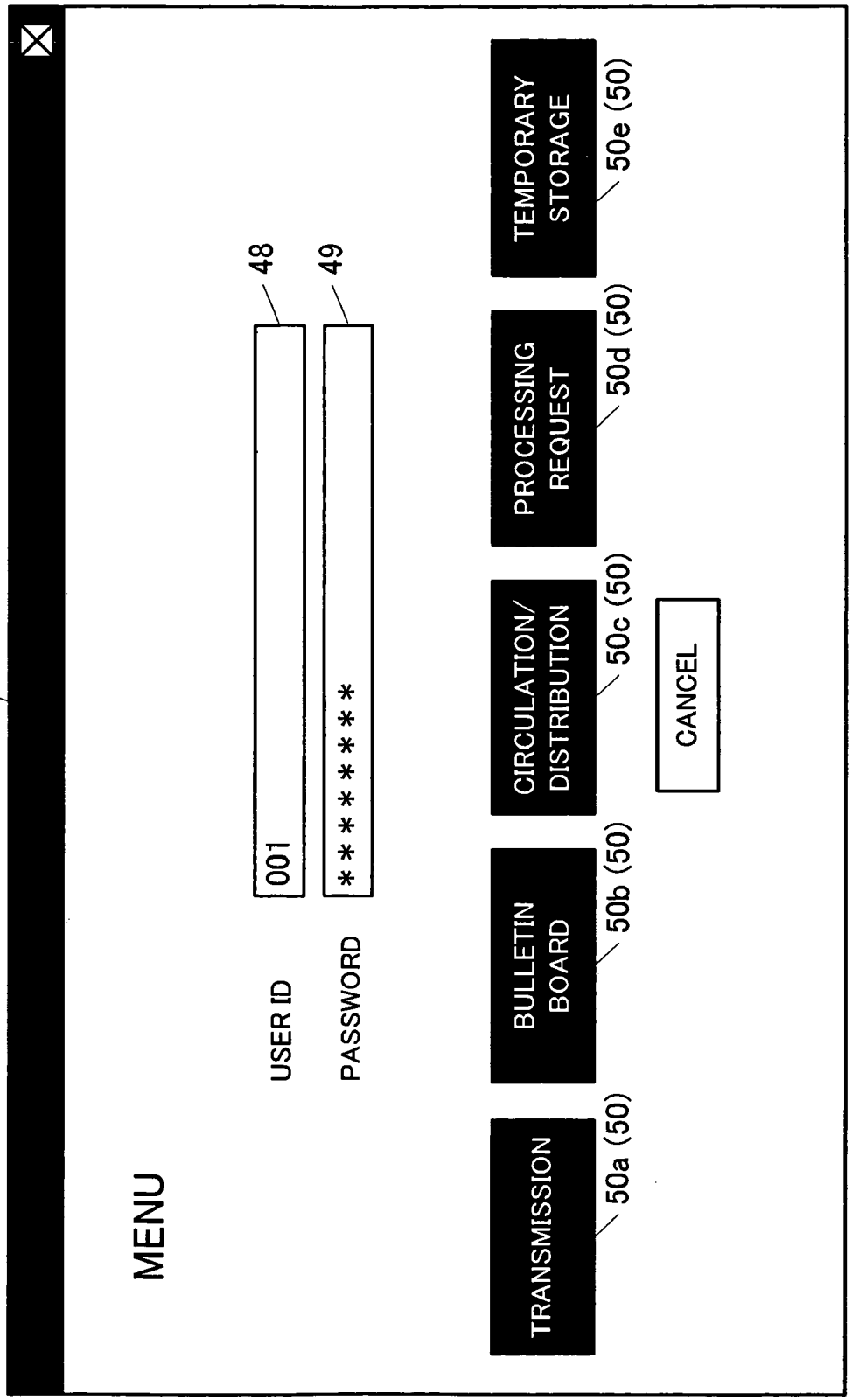

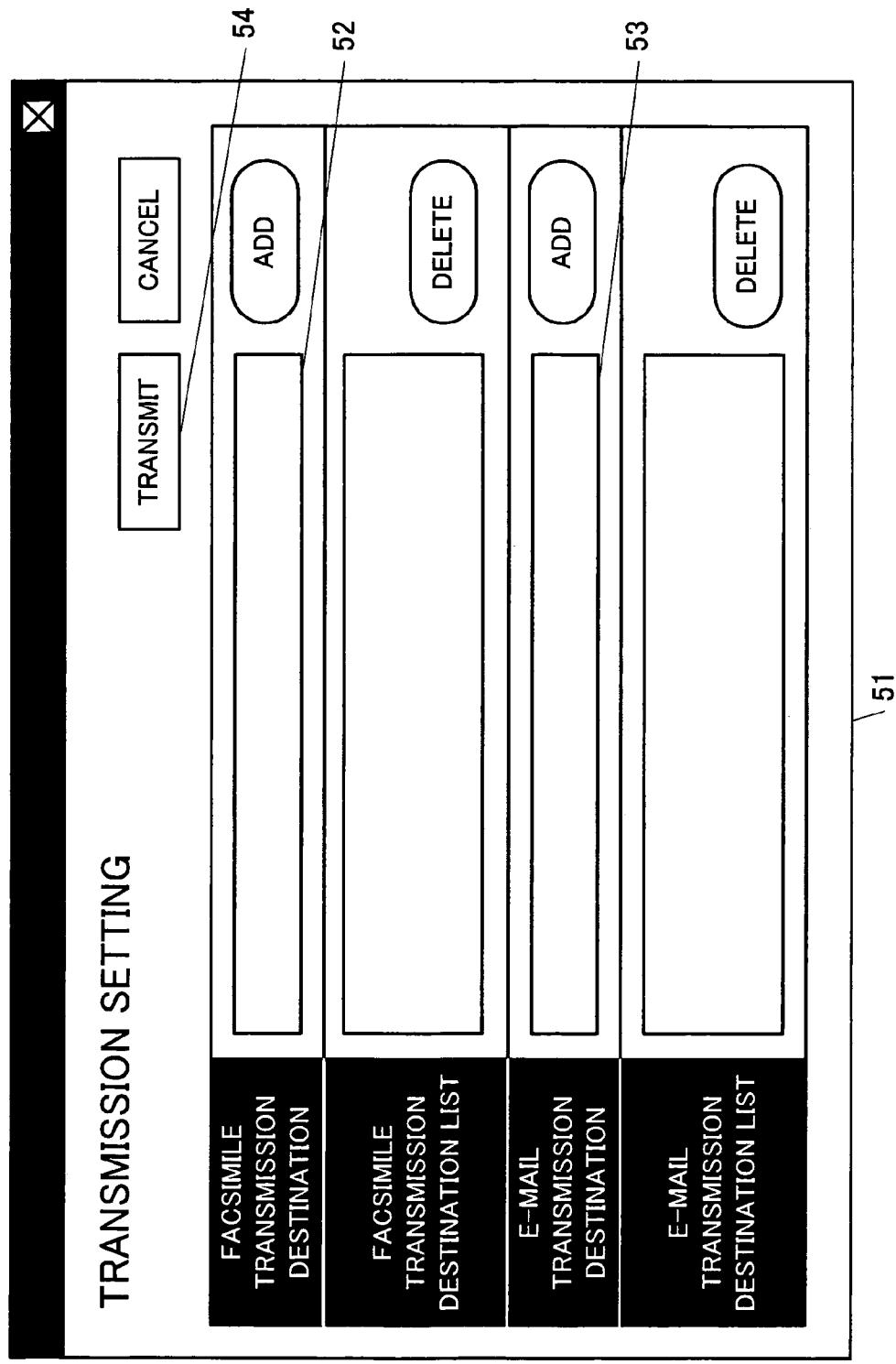

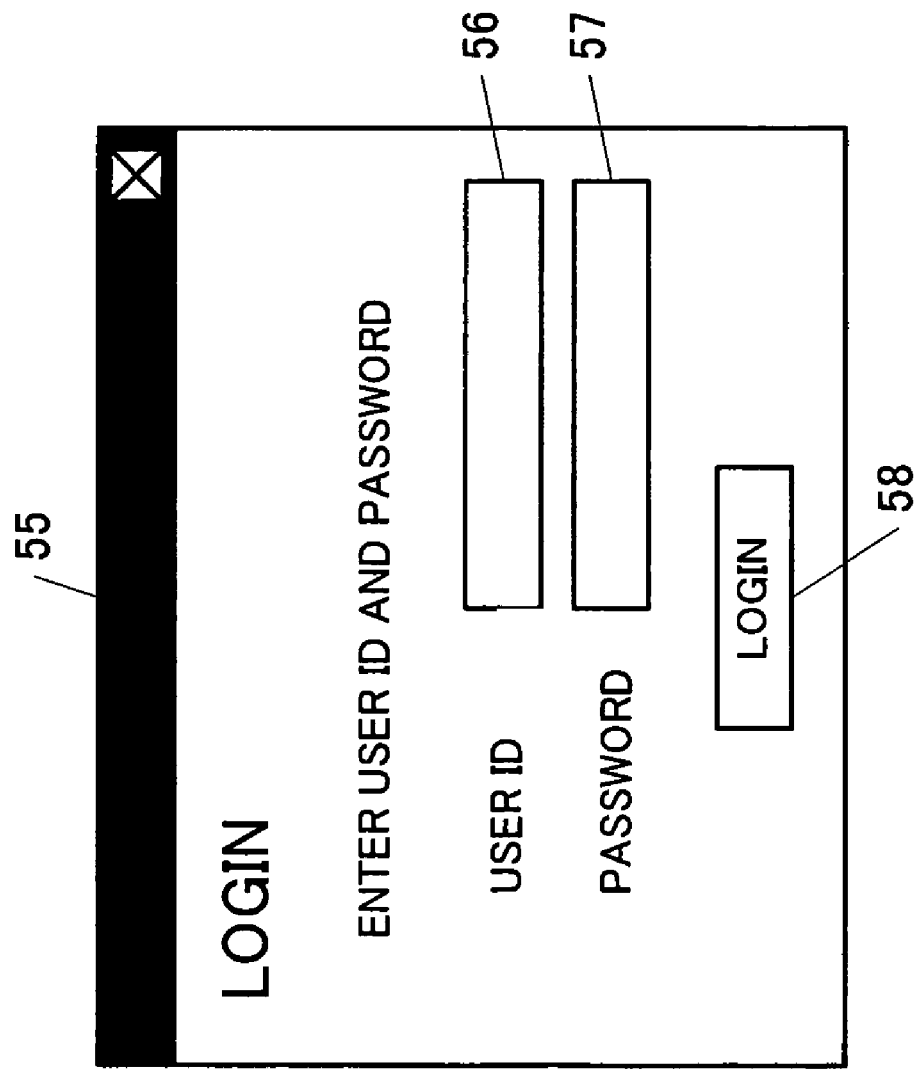

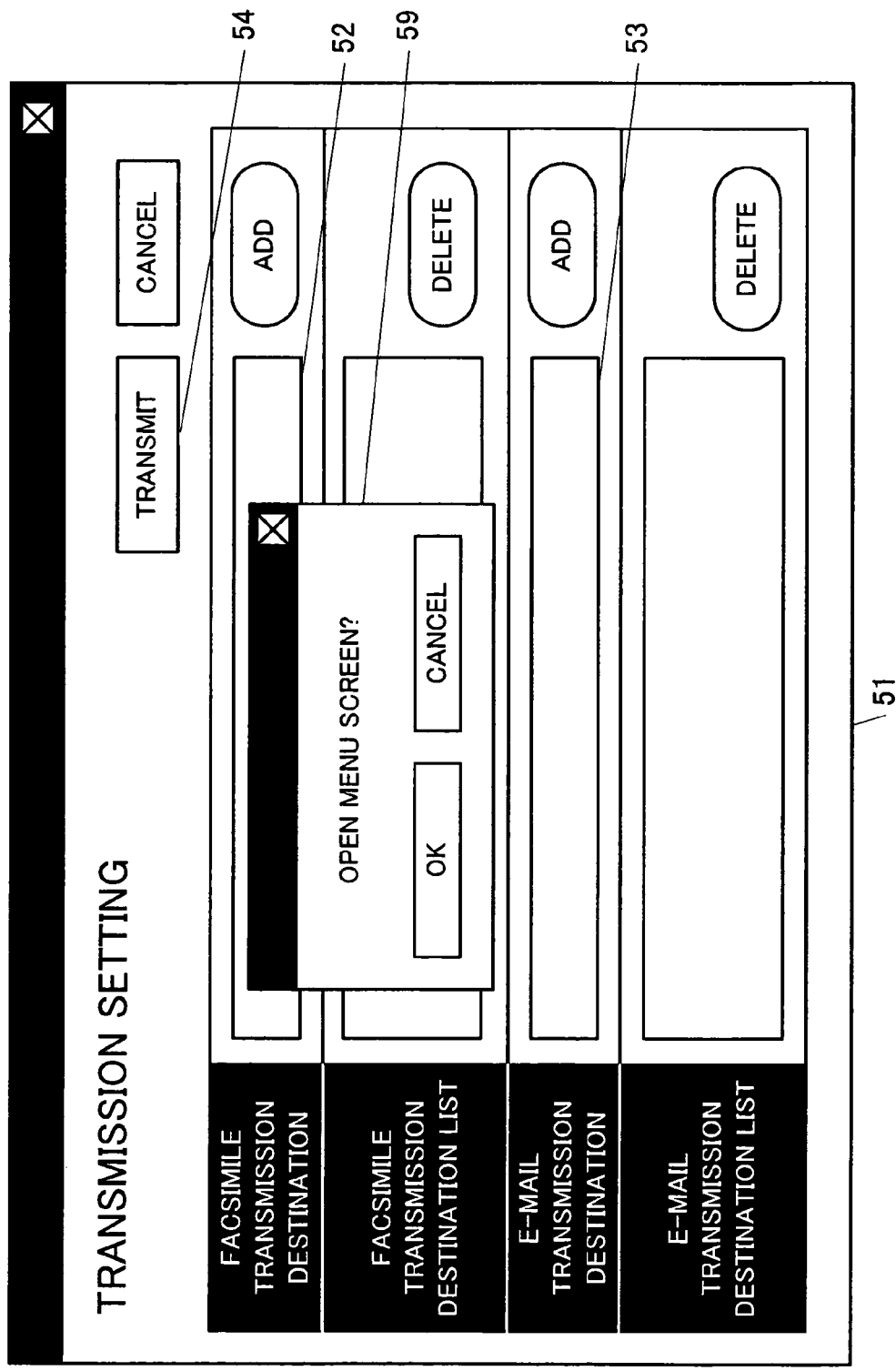

US 7,752,571 B2

PROGRAM RECORDING MEDIUM RECORDED WITH FACSIMILE DRIVER PROGRAM

FIELD OF THE INVENTION

The present invention relates to a program recording medium recorded with a facsimile driver program for use by a client device to request a multifunction device, having a plurality of server functions of transmission, bulletin board, circulation, and others, to execute various types of processes.

DESCRIPTION OF THE RELATED ART

The multifunction devices currently on the market are provided with a plurality of server functions of transmission, bulletin board, circulation, and others. Such a multifunction device is connected with a client device, which is installed with a facsimile driver program to make requests to the multifunction device for various types of processes.

Such a multifunction device is capable of applying a plurality of processes to image data.

For such process execution, a user is first required to select the type of process he or she wants to make the multifunction device execute via the client device.

Such a selection of process type is to be made by the user on a screen displayed by a browser of the client device, for example.

Described now is a case where a multifunction device is made to apply a transmission or other process with respect to image data of a document created by document creation or other software installed to a client device. FIG. 6A is a diagram showing an exemplary document creation screen 101 to be displayed by the document creation software. On the document creation screen 101 of FIG. 6A, when a print button 102 is operated by a mouse (not shown) or other device, the client device runs a facsimile driver program. After the running of the facsimile driver program, the client device forwards the image data of the created document and a command to the multifunction device to request a menu screen for a process type selection. Upon reception of the image data and the command from the client device, the multifunction device forwards back a menu screen 103 of FIG. 6B to the client device. The client device then makes a browser display the menu screen 103 thus provided by the multifunction device. The client device forwards, by selection of the user, any of a transmission icon 104, a bulletin board icon 105, and a circulation icon 106 to the multifunction device. The transmission icon 104 indicates a transmission process, the bulletin board icon 105 indicates a bulletin board process, and the circulation icon 106 indicates a circulation process. Assuming that the transmission icon 104 is selected, a request is forwarded to the multifunction device for the selected transmission process. When receiving the request from the client device for the transmission process, for example, the multifunction device forwards back a transmission setting screen 107 of FIG. 6C to the client device. As exemplarily shown in FIG. 6C, the transmission setting screen 107 is provided with an input box or other means for entry of a facsimile number and an email address of a transmission destination. When receiving a request from the client device for the bulletin board process, the multifunction device forwards back a bulletin board setting screen 108 to the client device. When receiving a request from the client device for the circulation process, the multifunction device forwards back a circulation setting screen 109 to the client device. These setting screens 107 to 109 are used to set details of the processes that the client device is requesting the multifunction device to execute. The client device makes the browser display the setting screen coming from the multifunction device, and forwards information to the multifunction device that is set by the user on the setting screen. Upon reception of the information set on the setting screen, the multifunction device forwards the image data by facsimile, for example.

As described above, when a multifunction device is provided with a plurality of server functions of transmission, bulletin board, circulation, and other functions, a facsimile driver program causes a client device to acquire a menu screen such as menu screen 103 as shown in FIG. 6B. A user then selects any of the icons 104 to 106 displayed on the menu screen 103 so that the process is defined by type for request to the multifunction device. The problem here is that, even when the user wants the multifunction device to execute only a specific process, the process must still be defined by the user by type every time to use the server functions of the multifunction device via the client device. Such repetitive definition of a specific process is considered needless.

In addition to defining the process by type for request to the multifunction device on the menu screen 103, the user is also required to enter authentication information such as user ID and password. Such entry of authentication information is also considered needless.

SUMMARY OF THE INVENTION

The present invention is proposed in consideration of such problems, and an object thereof is to provide a facsimile driver program that saves users' needless operations in the course of providing a client device with a function of making requests for various types of processes to a multifunction device, which has a plurality of server functions of transmission, bulletin board, circulation, and other functions.

In order to achieve the above-described object, one embodiment of the present invention is directed to a program recording medium recorded with a facsimile driver program. The program is installed on a client device that comprises means for sending a request for image data processing to a multifunction device having a plurality of server functions, means for entering a type of process that is requested of the multifunction device, and a first transmission unit for transmitting a command to the multifunction device asking for a screen corresponding to the entered type of process.

The facsimile driver program may further comprises means for entering necessary/not necessary information about a selection screen for selecting the type of process that is requested of the multifunction device, and second transmission means for transmitting to the multifunction device, when the entered necessary/not necessary information indicates as necessary, a command asking for the selection screen. When the entered necessary/not necessary information indicates as not necessary, the first transmission means transmits to the multifunction device the command asking for the screen corresponding to the entered type of process.

The facsimile driver program may further comprises means for entering authentication information. The first transmission means transmits to the multifunction device the entered authentication information together with the command asking for the screen corresponding to the type of process, and the second transmission means transmits to the multifunction device the entered authentication information together with the command asking for the selection screen.

The facsimile driver program may further comprise means for entering a setting indicating whether or not to transmit the entered authentication information to the multifunction device. The first transmission unit transmits to the multifunction device, when the entered setting indicates transmission to the multifunction device, the entered authentication information together with the command asking for the screen corresponding to the type of process, and the second transmission unit transmits to the multifunction device, when the entered setting indicates transmission to the multifunction device, the entered authentication information together with the command asking for the selection screen.

According to the present invention, a user who wants a multifunction device to go through a specific process enters the type of a process to a client device prior to making a request to the multifunction device. This eliminates the need for the user to select the type of process every time he or she makes a request to the multifunction device to use the server functions thereof via the client device.

As such, this favorably eliminates the need for the user to go through the useless operations.

Further, according to the present invention, a user who wants the multifunction device to go through a specific process enters to the client device "not necessary" as necessary/not necessary information about a selection screen, and the type of a process to the client device prior to making a request to the multifunction device. This advantageously eliminates the need for the user to select the process type every time he or she makes a request to the multifunction device to use the server functions thereof via the client device.

The user who wants the multifunction device to go through various types of process enters to the client device "necessary" as the necessary/not necessary information about the selection screen. This advantageously eliminates the need for the user to select the type of process every time he or she makes a request to the multifunction device to use the server functions thereof via the client device.

According to the present invention, a user enters authentication information to the client device so that the need for the user to go through a needless operation of entering authentication information can be eliminated every time he or she makes a request to the multifunction device to use the server functions thereof via the client device.

According to the present invention, only when a setting is entered to transmit the authentication information to the multifunction device, the authentication information is forwarded to the multifunction device. Accordingly, a user enters a setting to the client device not to forward the authentication information to the multifunction device so as to prevent any other users from using the server functions of the multifunction device from his or her client device.

BRIEF DESCRIPTION OF THE DRAWINGS

FIG. 1 is a block diagram showing an exemplary configuration of a client PC installed with a facsimile driver program in an embodiment of the present invention;

FIG. 2 is a diagram showing an exemplary facsimile driver setting screen;

FIG. 3 is a diagram showing an exemplary menu screen;

FIG. 4A is a diagram showing an exemplary transmission setting screen;

FIG. 4B is a diagram showing an exemplary login screen;

FIG. 5 is a diagram showing another exemplary transmission setting screen and an exemplary popup screen;

DESCRIPTION OF THE PREFERRED EMBODIMENT

Figure 6A:
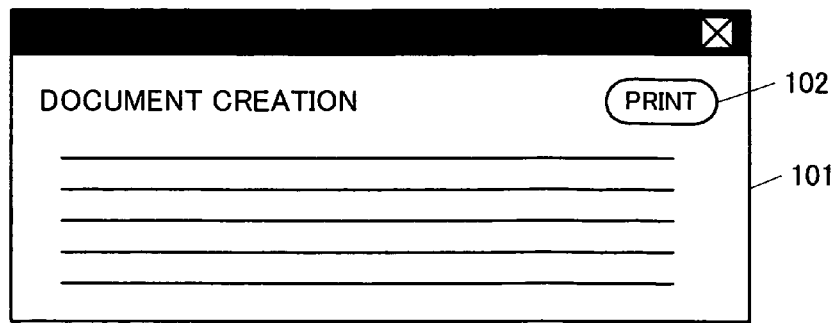
FIG. 6A is a diagram showing an exemplary document creation screen.
Figure 6B:
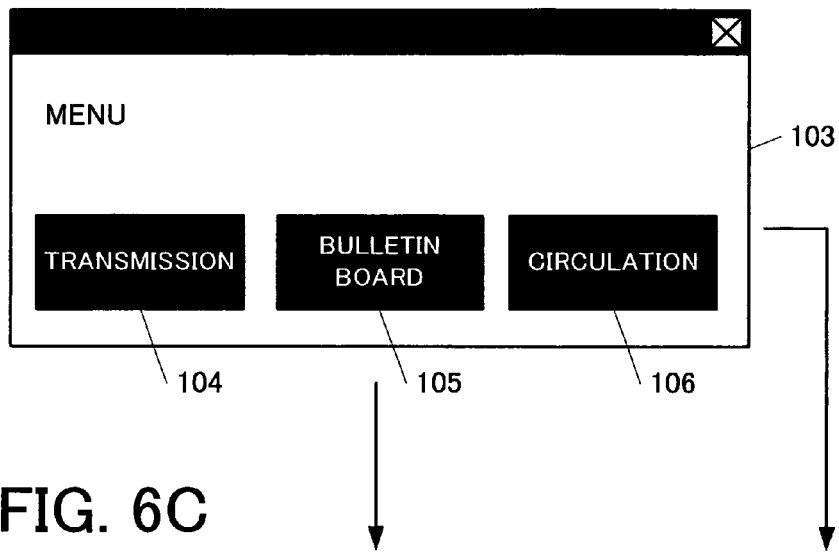
FIG. 6B is a diagram showing another exemplary menu screen.
Figure 6C:
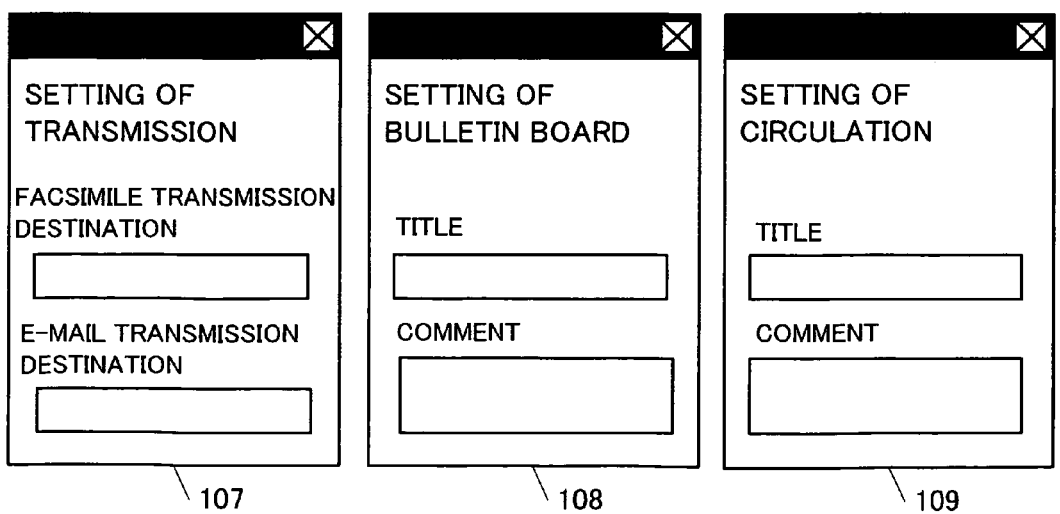
FIG. 6C is an exemplary setting screen.

A facsimile driver program in an embodiment of the present invention is described below by referring to the accompanying drawings. As shown in FIG. 1, a program recording medium 2 recorded with a facsimile driver program of the present invention is installed on a client device 10 such as a personal computer (hereinafter, referred to as "client PC"). The program recording medium 2 thus becomes operable as a facsimile driver program 1. The client PC 10, via facsimile driver program 1, has a function of making requests for various types of processes Such requests are directed to a multifunction device 30, which is connected to the client PC 10 over a LAN (Local Area Network). Although this embodiment is described as a case where the client device is a personal computer, this is not restrictive, and the client device may be a workstation, for example.

The program recording medium 2 may be a CD-ROM, floppy disk, DVD, ROM, or other recording medium.

As exemplarily shown in FIG. 1, the client PC 10 is configured to include a control section 11, an operation section 12, a display section 13, an auxiliary storage device 14, a LAN I/F (Local Area Network Interface) 15, and other components. The components 11 to 15 are connected together via a bus 16 for communications. Although not shown, the control section 11 includes a CPU (Central Processing Unit), a ROM (Read Only Memory), a RAM (Random Access Memory), and other components. The control section 11 goes through various types of processes in accordance with programs, e.g., a control program stored in the ROM, and the facsimile driver program 1 installed in the auxiliary storage device 14. Although not shown, the operation section 12 includes a keyboard, a mouse, and other operation devices, and is provided for entering and selecting various types of information. The display section 13 is a monitor for displaying thereon various types of screens. The auxiliary storage device 14 is loaded with various types of programs, e.g., the facsimile driver program 1. The LAN I/F 15 is an interface for connecting together the LAN 20 and the client PC 10 for communications. The client PC 10 is also equipped with OS (Operating Systems), a browser, and other systems and components.

Multifunction device 30 is connected with the client PC 10 over the LAN 20 and is provided with a plurality of server functions. More specifically, the server functions include a facsimile server function, a bulletin board server function, a circulation server function, a process request server function, and a temporary storage server function. The facsimile server function is of transmitting, by facsimile or the Internet facsimile, image data coming from the client PC 10 to any external device (not shown). The bulletin board server function is of uploading the image data into a predetermined HTML (Hypertext Markup Language) file (hereinafter, referred to as Web page). The circulation and process request server functions are of distributing the image data to other client PCs, and the temporary storage server function is of temporarily storing the image data in the multifunction device 30. The multifunction device 30 is also provided with a Web server function, and forwards a Web page to the client PC 10 in response to a request made thereby. The multifunction device 30 and the client PC 10 communicate with each other based on HTTP (Hyper Transfer Protocol), for example.

As described above, the multifunction device 30 is provided with a plurality of server functions, and goes through the processes of transmission, bulletin board, circulation, and others with respect to the image data coming from the client PC 10. Prior to such processes, the user needs to select the type of process he or she wants the multifunction device 30 to apply to the image data coming from the client PC 10. If the user wants the multifunction device 30 to execute only a specific process, such a process type selection prior to making a request to the multifunction device 30 may annoy the user. The user is thus allowed to make a setting to the client PC 10 to skip such a process type selection.

Such a setting to skip the process type selection is made on a facsimile driver setting screen as described below, for example. When a user goes through a predetermined operation in the client PC 10, the client PC 10 responsively runs the facsimile driver program 1 so that a facsimile driver setting screen 40 of FIG. 2 appears on the display section 13. As exemplarily shown in FIG. 2, the facsimile driver setting screen 40 is configured to include a user ID enter box 41, a password enter box 42, a "skip login" check box 43, radio buttons 44a (44) to 44e (44), radio buttons 45a (45) and 45b (45), a setting button 46, and others. The user ID enter box 41 is used to enter a user ID, and the password enter box 42 is to enter a password. The "skip login" check box 43 allows the user to select whether authentication information must be entered every time he or she makes a request to the multifunction device 30. Thus, by checking box 43, login can be skipped. The authentication information includes a user ID and a password. The radio buttons 44a to 44e are provided to select the type of process that multifunction device 30 will be requested to execute. The radio buttons 45a and 45b are provided to select whether a menu or selection screen is needed to select the type of process the multifunction device 30 is to execute. Such a selection screen is herein after referred to as a menu screen. The setting or set button 46 is used to enter information entered or selected on the screen.

The information entered or selected on the facsimile driver setting screen 40 is entered into the registry of the facsimile driver program 1 when the user operates the setting button 46 through the operation section 12. More in detail, the client PC 10 enters both the user ID in the user ID input box 41, and the password in the password input box 42. When the check box 43 is indicated by a checkmark, the client PC 10 enters a setting of transmitting authentication information to the multifunction device 30 every time a process request is issued to the multifunction device 30. When the check box 43 is not indicated by a checkmark, client PC 10 enters a setting of not transmitting the authentication information to the multifunction device 30. The client PC 10 enters the type of process indicated by any selected radio button 44. Assuming that the radio button 44a indicating the transmission process is selected, the "transmission process" is entered as the process type. When the radio button 45a ("open") is selected, the client PC 10 enters "necessary" as necessary/not necessary information about the menu screen to indicate that the menu screen is needed. When the radio button 45b ("not open") is selected, "not necessary" is entered as the necessary/not necessary information about the menu screen to indicate that the menu screen is not needed.

Described now is a case where a request is made to the multifunction device 30 to apply a process to image data of a document created by document creation software installed in the auxiliary storage device 14 of the client PC 10. FIG. 6A is a diagram showing an exemplary document creation screen 101 to be displayed on the display section 13 by the document creation software. On the document creation screen 101 of FIG. 6A, when the print button 102 is operated through the operation section 12, the facsimile driver program 1 is responsively run. By the running of the facsimile driver program 1, the client PC 10 forwards, together with the image data, commands or other means to request the multifunction device 30 for various types of screens. Depending on the type of information entered in the registry of the facsimile driver program 1, the transmitting commands vary in type.

When the registry of the facsimile driver program 1 is entered with "necessary" as the necessary/not necessary information about the menu screen, and when the setting is entered not to transmit the authentication information to the multifunction device 30, together with the image data, the client PC 10 forwards a command asking for the menu screen to the multifunction device 30. Upon reception of the command asking for the menu screen and the image data, the multifunction device 30 forwards back a Web page of the menu screen 47 of FIG. 3A to the client PC 10.

Upon reception of the Web page of the menu screen 47 provided by the multifunction device 30, the client PC 10 runs the browser, and the browser displays the menu screen 47 on the display section 13. As exemplarily shown in FIG. 3A, the menu screen 47 is configured to include a user ID enter box 48, a password enter box 49, icons 50a to 50e, and other items. The user ID enter box 48 is used to enter a user ID, and the password enter box 49 is to enter a password. The icons 50a to 50e are for a selection of the type of process that will be requested of the multifunction device 30. When any of the icons 50 is operated through the operation section 12, the client PC 10 forwards to the multifunction device 30 a command requesting the screen corresponding to the process type indicated by the operated icon 50, and the entered authentication information. Assuming that icon 50a indicating the transmission process is operated, the client PC 10 forwards a command asking for the screen corresponding to the "transmission process", and the authentication information, to the multifunction device 30. Described below is an exemplary case where the client PC 10 forwards the command asking for the screen corresponding to the "transmission process".

Upon reception of the command asking for the screen corresponding to the "transmission process" and the authentication information, the multifunction device 30 forwards back a Web page of a transmission setting screen 51 of FIG. 4A to the client PC 10. Upon reception of the Web page of the transmission setting screen 51 provided by the multifunction device 30, the client PC 10 makes the browser display the transmission setting screen 51 on the display section 13. The screens corresponding to the type of process requested of the multifunction device 30, including the transmission setting screen 51, are for setting the details of the processes requested of the multifunction device 30. As exemplarily shown in FIG. 4A, the transmission setting screen 51 is configured to include a facsimile number enter box 52, a mail address enter box 53, a transmission button 54, and other items. The facsimile number enter box 52 is used to enter the facsimile number of a transmission destination, and the mail address entry box 53 is to enter the email address of the transmission destination. The transmission button 54 is used to issue a command asking the multifunction device 30 to transmit the image data. The facsimile number and the mail address entered on the transmission setting screen 51 are forwarded to the multifunction device 30 when the transmission button 54 is operated by the user through the operation section 12. Upon reception of the facsimile number and the mail address of the transmission destination from the client PC 10, based thereon, the multifunction device 30 forwards the image data to the transmission destination.

As such, when the registry of the facsimile driver program 1 is entered with "necessary" as the necessary/not necessary information about the menu screen, and when the setting is entered not to forward the authentication information to the multifunction deice 30, as is conventionally done, the user is required to select the type of process for request to the multifunction device 30, and enter the authentication information. On the other hand, when the setting of transmitting the authentication information to the multifunction device 30 is already entered, the process of entering the authentication information is skipped. Further, when "not necessary" is entered as the necessary/not necessary information about the menu screen, the process of selecting the type of process for request to the multifunction device 30 is skipped.

When the registry of the facsimile driver program 1 is entered with "necessary" as the necessary/not necessary information about the menu screen, and when the setting is entered to transmit the authentication information to the multifunction device 30, the client PC 10 forwards to the multifunction device 30 a command asking for the menu screen together with the image data. Upon reception of the command asking for the menu screen, the authentication information, and the image data, the multifunction device 30 forwards back a Web page of the menu screen 47 of FIG. 3B to the client PC 10. Unlike the menu screen 47 of FIG. 3A, in the Web page of the menu screen 47, the user ID enter box 48 and the password input box 49 are entered with the user ID and the password, respectively, coming from the client PC 10. Upon reception of the Web page of the menu screen 47 provided by the multifunction device 30, the client PC 10 makes the browser display the menu screen 47 on the display section 13. As shown in FIG. 3B, the user ID enter box 48 and the password enter box 49 of the menu screen 47 are entered with the user ID and the password, respectively. Therefore, the user can select the type of process requested of the multifunction device 30 from the client PC 10 by operating icons 50, without the need to enter the authentication information.

When the registry of the facsimile driver program 1 is entered with "not necessary" as the necessary/not necessary information about the menu screen, and when the setting is entered not to transmit the authentication information to the multifunction device 30, the client PC 10 forwards to the multifunction device 30 a command asking for the screen corresponding to the process type entered in the registry together with the image data. For example, a command asking for the screen corresponding to the "transmission process" is forwarded to the multifunction device 30. Upon reception of the command asking for a screen corresponding to a specific process type, the multifunction device 30 forwards back the Web page of a login screen 55 of FIG. 4B to the client PC 10.

Upon reception of the Web page of the login screen 55 provided by the multifunction device 30, the client PC 10 makes the browser display the login screen 55 on the display section 13. As exemplarily shown in FIG. 4B, the login screen 55 is configured to include a user ID enter box 56, a password enter box 57, a login button 58, and other items. The user ID enter box 56 is used to enter a user ID, and the password enter box 56 is to enter a password. The login button 58 is provided for transmission of the authentication information entered on the screen to the multifunction device 30. When the login button 58 is operated, the user ID and the password entered through the login screen 55 are forwarded to the multifunction device 30. Upon reception of the user ID and the password, in accordance with the received command, the multifunction device 30 forwards back to the client PC 10 the screen corresponding to the process type, e.g., the Web page of the transmission setting screen 51 of FIG. 4A.

As such, when the registry of the facsimile driver program 1 is entered with "not necessary" as the necessary/not necessary information about the menu screen, and when the setting is entered not to transmit the authentication information to the multifunction device 30, the process of selecting the type of process requesting the multifunction device 30 is skipped, but the user is required to enter the authentication information every time he or she wants to use the server functions of the multifunction device 30 via the client PC 10. Accordingly, the user enters the setting to the client PC 10 not to forward the authentication information to the multifunction device 30 so as to prevent any other users from using the server functions of the multifunction device 30 from his or her client device.

When the registry of the facsimile driver program 1 is entered with "not necessary" as the necessary/not necessary information about the menu screen, and when the setting is entered to transmit the authentication information to the multifunction device 30, the client PC 10 forwards to the multifunction device 30 a command asking for a screen corresponding to the process type entered in the registry together with the image data. Upon reception of the command asking for the screen corresponding to the process type, the authentication information, and the image data, the multifunction device 30 forwards back to the client PC 10 the screen corresponding to the process type, e.g., the Web page of the transmission setting screen 51 of FIG. 4A.

As such, when the registry of the facsimile driver program 1 is entered with "not necessary" as the necessary/not necessary information about the menu screen, and when the setting is entered to transmit the authentication information to the multifunction device 30, the multifunction device 30 forwards back the screen corresponding to the process type to the client PC 10. The screen corresponding to the type of process requested of the multifunction device 30, e.g., the transmission setting screen 51, is thus displayed on the display section 13 of the client PC 10. Accordingly, when the user wants the multifunction device 30 to execute a specific process, the user enters to the client PC 10 "not necessary", (or "not open") as the necessary/not necessary information about the menu screen, and the type of process requested of the multifunction device 30. This eliminates the need to select the type of process requested of the multifunction device 30 every time the user uses the server functions of the multifunction device via the client device 10 so that the user is not required to go through the needless operations.

Note that, in this embodiment, when the necessary/not necessary information about the menu screen entered in the client PC 10 indicates as "not necessary", the Web page of a screen corresponding to any of the process types is forwarded back to the client PC 10 from the multifunction device 30. Alternatively, as shown in FIG. 5, the multifunction device 30 may forward back, to the client PC 10, the Web page of a popup menu 59 together with the screen corresponding to the process type, e.g., the transmission setting screen 51. The popup menu 59 is used for a selection of whether the menu screen 47 is to be displayed or not. When the menu screen 47 is to be displayed, the Web page of the menu screen 47 may be forwarded back to the client PC 10 from the multifunction device 30.

What is claimed is:

1. A program recording medium recorded with a facsimile driver program for installation on a client device, wherein the program comprises:

means for sending a request for image data processing to a multifunction device having a plurality of server functions, means for entering a type of process that is requested of the multifunction device, means for displaying a setting screen that includes means for setting whether a selection screen for selecting the type of process that is requested of the multifunction device is necessary and means for setting whether authentication information must be entered every time a request to the multifunction device is made, first transmission means for transmitting to the multifunction device, when the selection screen is set as not necessary, a command asking for a screen corresponding to the entered type of process, and second transmission means for transmitting to the multifunction device, when the selection screen is set as necessary, a command asking for the selection screen.

2. The program recording medium according to claim 1, wherein the first transmission means transmits to the multifunction device, when entry of authentication information is set as not necessary, authentication information that is pre-stored in a registry together with the command asking for the screen corresponding to the entered type of process, the first transmission means first transmits to the multifunction device, when entry of authentication information is set as necessary, the command asking for the screen corresponding to the entered type of process and, after that, transmits authentication information that is entered each time a request to the multifunction device is made and that is not pre-stored in the registry, the second transmission means transmits to the multifunction device, when entry of authentication information is set as not necessary, authentication information that is pre-stored in the registry together with the command asking for the selection screen.

3. The program recording medium according to claim 1, wherein the type of process that is requested from the multifunction device is selected from a group comprising: a transmission process, a bulletin board process, a circulation process, a processing request process and a temporary storage process.

4. The program recording medium according to claim 3, wherein when the selection screen is set as necessary, each type of process is displayed on the selection screen along with a button permitting selection of each process.

5. The program recording medium according to claim 1, wherein the means for setting whether the selection screen is necessary comprises buttons permitting a user to select whether a menu screen should be open or not open.

6. The program recording medium according to claim 2, wherein the means for setting whether authentication information must be entered every time a request to the multifunction device is made comprises a check box allowing the user to indicate that log in should be skipped.

7. A method for operating a multifunction device from a client device comprising:

(a) obtaining on a setting screen a selection of a type of process to request the multifunction device to perform;

(b) providing an option on the setting screen to either (1) automatically request the multifunction device to perform the initially selected process each time the client device operates the multifunction device; or (2) select a type of process each time the client device operates the multifunction device;

(c) obtaining authentication information on the setting screen from a user attempting to operate the multifunction device from the client device; and providing an option on the setting screen to either: (1) automatically provide the authentication information to the multifunction device on subsequent user logins; or (2) obtain authentication information from the user on each login, wherein, when step (b)(1) is selected, the client device requests a screen corresponding to the initially selected type of process each time the client device operates the multifunction device, and when step (b)(2) is selected, the client device presents a type of process selection screen to the user each time the client device operates the multifunction device.

8. A facsimile driver program embodied in a program recording medium and comprising the method of claim 7.

9. A client device comprising the facsimile driver program of claim 8.

10. A program for driving a multifunction facsimile machine embodied in a program recording medium, the program carrying out the following steps:

presenting on a setting screen a list of types of processes that may be requested of the multifunction facsimile machine;

obtaining on the setting screen a user selection of one of the listed types of processes;

obtaining on the setting screen a user selection of whether or not the selected type of process should be automatically requested of the multifunction facsimile machine in subsequent requests;

obtaining on the setting screen authentication information from the user; and obtaining on the setting screen a user selection of whether the authentication information should be automatically provided to the multifunction facsimile machine in subsequent requests, wherein, when the user selects that the selected type of process should be automatically requested, in subsequent requests, the program asks the multifunction facsimile machine for a screen corresponding to the selected type of process without displaying a selection screen showing the available types of processes, and when the user selects that the selected type of process should not be automatically selected, in subsequent requests, the user displays the selection screen showing the available types of processes, and obtains a selection, before asking the multifunction facsimile machine for the screen corresponding to the selected type of process.

11. The program according to claim 10, wherein, when the user does not select that the authentication information should be automatically provided to the multifunction facsimile machine, in subsequent requests, the user is asked to re-enter the authentication information.

12. A client device comprising the program of claim 10, and a local area network interface for communication with the multifunction facsimile machine.

* * * * *